United States Patent
Diop et al.

(10) Patent No.: US 11,265,142 B2
(45) Date of Patent: Mar. 1, 2022

(54) PROTECTION OF AN ITERATIVE CALCULATION

(71) Applicant: STMICROELECTRONICS (ROUSSET) SAS, Rousset (FR)

(72) Inventors: Ibrahima Diop, Marseilles (FR); Yanis Linge, Fuveau (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 438 days.

(21) Appl. No.: 16/435,309

(22) Filed: Jun. 7, 2019

(65) Prior Publication Data

US 2019/0379526 A1 Dec. 12, 2019

(30) Foreign Application Priority Data

Jun. 8, 2018 (FR) ...................................... 1800583
Jun. 6, 2019 (EP) ...................................... 19178890

(51) Int. Cl.
*H04L 9/00* (2006.01)
*G06F 21/72* (2013.01)
*G06F 7/72* (2006.01)

(52) U.S. Cl.
CPC .............. *H04L 9/002* (2013.01); *G06F 21/72* (2013.01); *G06F 7/723* (2013.01)

(58) Field of Classification Search
CPC ....... H04L 9/002; H04L 9/302; H04L 9/3066; H04L 2209/12; H04L 9/004; H04L 9/003; G06F 21/72; G06F 7/723; G09C 1/00

(Continued)

(56) References Cited

U.S. PATENT DOCUMENTS 6,008,075 A 12/1999 Lien et al.
8,139,763 B2 3/2012 Boscher et al.
(Continued)

FOREIGN PATENT DOCUMENTS

EP 1 134 653 A2 9/2001
FR 2 875 355 A1 3/2006
(Continued)

OTHER PUBLICATIONS

U.S. Appl. No. 15/442,303, filed Feb. 24, 2017, Protection of a Modular Calculation.

(Continued)

*Primary Examiner* — Kambiz Zand
*Assistant Examiner* — Aubrey H Wyszynski
(74) *Attorney, Agent, or Firm* — Seed IP Law Group LLP

(57) ABSTRACT

The disclosure concerns a method of protecting a calculation on a first number and a second number, including the steps of: generating a third number including at least the bits of the second number, the number of bits of the third number being an integer multiple of a fourth number; dividing the third number into blocks each having the size of the fourth number; successively, for each block of the third number: performing a first operation with a first operator on the contents of a first register and of a second register, and then on the obtained intermediate result and the first number, and placing the result in a third register; and for each bit of the current block, performing a second operation by submitting the content of the third register to a second operator with a function of the rank of the current bit of the third number, and then to the first operator with the content of the first or of the second register according to state "0" or "1" of said bit, and placing the result in the first or second register.

28 Claims, 5 Drawing Sheets

(58) Field of Classification Search
USPC .......................................................... 713/192
See application file for complete search history.

(56) References Cited

U.S. PATENT DOCUMENTS

| | | | |
|---|---|---|---|
| 9,014,368 | B2 | 4/2015 | Teglia |
| 10,025,559 | B2 | 7/2018 | Diop et al. |
| 10,354,063 | B2 | 7/2019 | Diop et al. |
| 2005/0078821 | A1 | 4/2005 | Jin et al. |
| 2005/0216779 | A1* | 9/2005 | Ferrand ................. G06F 9/3836 713/324 |
| 2008/0019509 | A1 | 1/2008 | Al-Gahtani et al. |
| 2008/0044010 | A1 | 2/2008 | Vasyltasov |
| 2008/0175385 | A1 | 7/2008 | Lee et al. |
| 2009/0067617 | A1 | 3/2009 | Trichina et al. |
| 2009/0092245 | A1* | 4/2009 | Fumaroli ................. G06F 7/723 380/28 |
| 2009/0097637 | A1 | 4/2009 | Boscher et al. |
| 2013/0016826 | A1 | 1/2013 | Teglia |
| 2013/0016828 | A1 | 1/2013 | Teglia |
| 2014/0281573 | A1* | 9/2014 | Jaffe ....................... G06F 21/72 713/189 |
| 2015/0063561 | A1 | 3/2015 | Teglia |
| 2015/0339102 | A1* | 11/2015 | Feix ...................... H04L 9/3066 380/30 |
| 2017/0187529 | A1 | 6/2017 | Guilley et al. |
| 2018/0060040 | A1* | 3/2018 | Diop ....................... G06F 7/722 |
| 2018/0101383 | A1* | 4/2018 | Fukuda .............. G05B 19/0428 |

FOREIGN PATENT DOCUMENTS

| | | |
|---|---|---|
| FR | 2 979 725 A1 | 3/2013 |
| GB | 2 399 904 A | 9/2004 |
| WO | 2006/103341 A1 | 10/2006 |
| WO | 2016/053792 A1 | 4/2016 |

OTHER PUBLICATIONS

U.S. Appl. No. 15/442,322, filed Feb. 24, 2017, Protection of a Modular Exponentiation Calculation.

U.S. Appl. No. 16/041,077, filed Jul. 20, 2018, Protection of an Iterative Calculation Against Horizontal Attacks.

U.S. Appl. No. 16/435,307, filed Jun. 7, 2019, Protection of an Iterative Calculation.

Choi et al., "An Improved Square-always Exponentiation Resistant to Side-channel Attacks on RSA Implementation," *Intelligent Automation & Soft Computing* 22(3):353-363, 2016.

Clavier et al., "Horizontal Correlation Analysis on Exponentiation," *Twelfth International Conference on Information and Communications Security*, Barcelona, Spain, Dec. 2010, 19 pages.

Feix et al., "Side-Channel Analysis on Blinded Regular Scalar Multiplications," *Proceedings of INDOCRYPT 2014*, Jan. 1, 2014, 25 pages.

Ha et al., "Power Analysis Attacks on the Right-to-Left Square-Always Exponentiation Algorithm," *Journal of Internet Services and Information Security* 4(4):38-51, 2014.

Joye et al., "The Montgomery Powering Ladder," *Cryptographic Hardware and Embedded Systems International Workshop 2002*, Aug. 13, 2002, 12 pages.

Kim et al., "Safe-Error Attack on SPA-FA Resistant Exponentiations Using a HW Modular Multiplier," International Conference on Information Security and Cryptology, Seoul, South Korea, 2007, 9 pages.

Lesavourey et al., "Efficient Randomized Regular Modular Exponentiation using Combined Montgomery and Barrett Multiplications," *Thirteenth International Conference on Security and Cryptography*, Lisbon, Portugal, Jul. 2016, 9 pages.

Itoh et al., "DPA Countermeasures by Improving the Window Method," Lecture Noted in Computer Sciences 2523:303-317, 2002.

U.S. Appl. No. 16/810,434, filed Mar. 5, 2020, Protection of an Iterative Calculation.

* cited by examiner

PROTECTION OF AN ITERATIVE CALCULATION

BACKGROUND

Description of the Related Art

The present disclosure generally concerns electronic circuits, such as circuits executing iterative operations. The present disclosure more specifically relates to the protection of modular exponentiation calculations or of calculations on elliptic curves against attacks aiming at discovering quantities manipulated by such calculations.

Description of the Related Art

In many applications, electronic circuits implement algorithms of encryption, authentication, signature calculation, and more generally algorithms manipulating data, called secret, that is, the access to which is desired to be reserved to certain users or circuits. Among such algorithms, some use iterative operations. These may be modular exponentiations, for example, RSA-type algorithms, or products on elliptic curves, for example ECDH-type algorithms.

There exist many methods, called attacks, to attempt discovering or hacking secret data manipulated by such calculations. Among such attacks, so-called side channel attacks, use indirect information such as the power consumption of the circuit (SPA, DPA attacks), the electromagnetic radiation thereof, etc. The interpretation of such information gives the hacker information relative to the secret data.

Among side-channel attacks, one can in particular distinguish attacks called vertical and attacks called horizontal.

Vertical attacks, more particularly targeted by a first aspect of the present disclosure, comprise using the observation of information leaks measured during a plurality of executions using the same secret information by means of statistical tools and by time sampling.

Horizontal attacks, more particularly targeted by a second aspect of the present disclosure, comprise comparing segments originating from a same trace (for example, power consumption or radiation) with one another, to extract the secret information. They use a single execution trace. Data masking countermeasures, which are efficient against vertical side channel attacks, are generally not efficient against horizontal attacks.

BRIEF SUMMARY

An embodiment facilitates improving the protection against side-channel attacks on data manipulated by algorithms employing iterative steps.

An embodiment facilitates overcoming all or part of the disadvantages of usual methods and circuits of protection of data manipulated by algorithms against side-channel attacks.

An embodiment provides a method of protection of a calculation by an electronic circuit, which facilitates overcoming all or part of the disadvantages of usual methods.

An embodiment facilitates providing a calculation method efficient against vertical attacks.

An embodiment facilitates providing a calculation method efficient against horizontal attacks.

An embodiment of a method of protecting a calculation on a first number and a second number, executed by an electronic circuit, comprises the steps of:

generating a third number comprising at least the bits of the second number, the number of bits of the third number being an integer multiple of a fourth number;
dividing the third number into blocks each having the size of the fourth number;
successively, for each block of the third number:
  performing a first operation with a first operator on the contents of a first register and of a second register, and then on the obtained intermediate result and the first number, and placing the result in a third register; and
  for each bit of the current block, performing a second operation by submitting the content of the third register to a second operator with a function of the rank of the current bit of the third number, and then to the first operator with the content of the first or of the second register according to state "0" or "1" of said bit, and placing the result in the first or second register.

According to an embodiment, said function is a raising of number 2 to the power of the rank of the current bit of the third number.

According to an embodiment, the third number is obtained by concatenation of the bits of the second number and of states "0".

According to an embodiment, the second register contains the result of the calculation.

According to an embodiment, the first and second registers are initialized with the neutral element of the first operator.

According to an embodiment, the first and second operations are performed modulo a fifth number.

According to an embodiment, the final content of the third register is compared with the result of a third operation submitting the first number to the second operator with number 2 raised to the power of the number of bits of the second number.

According to an embodiment, the index of the bits of each block increases from 0 to the value of the fourth number minus 1.

According to an embodiment, the bits of a same block are processed in a random order.

According to an embodiment, the bits of a same block are successively processed.

According to an embodiment, the order of the processing of the bits of a same block results from a permutation.

According to an embodiment, the calculation is a modular exponentiation of the first number by the second number.

According to an embodiment, the first operator is multiplication and the second operator is the raising to a power.

According to an embodiment, the calculation is a multiplication of a point of an elliptic curve by a scalar.

According to an embodiment, the first operator is addition and the second operator is multiplication.

An embodiment provides an electronic circuit configured to implement the protection method.

The foregoing and other example features and advantages of various embodiments will be discussed in detail in the following non-limiting description of specific embodiments in connection with the accompanying drawings.

In an embodiment, a method comprises: performing, using an electronic circuit, a calculation on a first number and a second number; and protecting the performing of the calculation, wherein the method includes: generating a third number comprising at least the bits of the second number, a number of bits of the third number being an integer multiple of a fourth number; dividing the third number into blocks each having a size in bits of the fourth number; and successively, for each block of the third number: performing a first function, the first function using a first operator, on contents of a first register, contents of a second register and the first number, and placing a result of the first function in a third register; and for each bit of the current block, performing a second function, the second function using a second operator, on: contents of the third register; a rank of a current bit of the third number; and the contents of a selected one of the first and the second register according to a state of said current bit; and placing a result of the second function in the selected one of the first and second register. In an embodiment, said second function includes raising of number 2 to a power of the rank of the current bit of the third number. In an embodiment, the method comprises generating the third number by concatenation of the bits of the second number and of states "0". In an embodiment, the second register contains the result of the calculation. In an embodiment, the first and second registers are initialized with a neutral element of the first operator of the first function. In an embodiment, the first and second functions are performed modulo a fifth number. In an embodiment, the method comprises comparing a final content of the third register with a result of a third function performed on the first number and number 2 raised to a power of a number of bits of the second number. In an embodiment, an index of the bits of each block increases from 0 to a value of the fourth number minus 1. In an embodiment, bits of a same block are processed in a random order. In an embodiment, bits of a same block are successively processed. In an embodiment, an order of the processing of bits of a same block results from a permutation. In an embodiment, the calculation is a modular exponentiation of the first number by the second number. In an embodiment, the first operator is multiplication and the second operator is raising to a power. In an embodiment, the calculation is a multiplication of a point of an elliptic curve by a scalar. In an embodiment, the first operator is addition and the second operator is multiplication.

In an embodiment, a device comprises: a memory including a plurality of registers; and cryptographic circuitry coupled to the memory, wherein the cryptographic circuitry, in operation, performs a calculation on a first number and a second number, wherein the performing the calculation includes: generating a third number comprising at least the bits of the second number, a number of bits of the third number being an integer multiple of a fourth number; dividing the third number into blocks each having a size in bits of the fourth number; and successively, for each block of the third number: performing a first function, the first function using a first operator, on contents of a first register of the memory, contents of a second register of the memory and the first number, and placing a result of the first function in a third register of the memory; and for each bit of the current block, performing a second function, the second function using a second operator, on: contents of the third register; a rank of a current bit of the third number; and the contents of a selected one of the first and the second register according to a state of said current bit; and placing a result of the second function in the selected one of the first and second register. In an embodiment, said second function includes raising of number 2 to a power of the rank of the current bit of the third number. In an embodiment, the cryptographic circuitry generates the third number by concatenating bits of the second number and states "0". In an embodiment, the second register contains the result of the calculation. In an embodiment, the first and second registers are initialized with a neutral element of the first operator of the first function. In an embodiment, the first and second functions are performed modulo a fifth number. In an embodiment, the cryptographic circuitry, in operation: performs a third function on the first number and number 2 raised to a power of a number of bits of the second number; and compares a result of the third function to contents of the third register. In an embodiment, an order of processing of bits of a block is based on a permutation. In an embodiment, the calculation is a modular exponentiation of the first number by the second number. In an embodiment, the calculation is a multiplication of a point of an elliptic curve by a scalar.

In an embodiment, a non-transitory computer-readable medium has contents which cause cryptographic circuitry to perform a calculation on a first number and a second number, wherein the performing the calculation includes: generating a third number comprising at least the bits of the second number, a number of bits of the third number being an integer multiple of a fourth number; dividing the third number into blocks each having a size in bits of the fourth number; and successively, for each block of the third number: performing a first function, the first function using a first operator, on contents of a first register of the memory, contents of a second register of the memory and the first number, and placing a result of the first function in a third register of the memory; and for each bit of the current block, performing a second function, the second function using a second operator, on: contents of the third register; a rank of a current bit of the third number; and the contents of a selected one of the first and the second register according to a state of said current bit; and placing a result of the second function in the selected one of the first and second register. In an embodiment, the contents comprise instructions which, when executed, cause the cryptographic circuitry to perform the calculation. In an embodiment, the first and second functions are performed modulo a fifth number.

DETAILED DESCRIPTION

Figure 1:
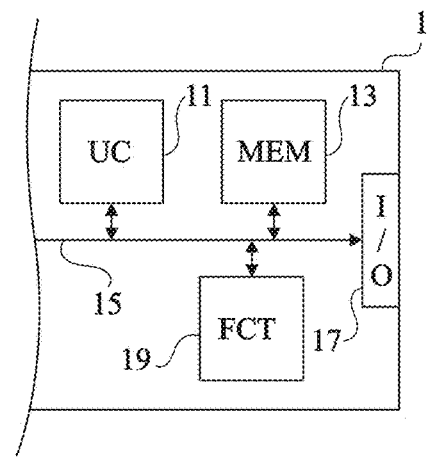
FIG. 1 schematically shows an embodiment of an electronic circuit.

The same elements have been designated with the same reference numerals in the different drawings unless the context indicates otherwise. In particular, the structural and/or functional elements common to the different embodiments may be designated with the same reference numerals and may have identical structural, dimensional, and material properties.

For clarity, only those steps and elements which are useful to the understanding of the embodiments which will be described have been shown and will be detailed. In particular, the applications of the executed calculations or of the circuits executing them have not been detailed, the described embodiments being compatible with usual applications.

Unless otherwise specified, when reference is made to two elements connected together, this means directly connected with no intermediate element other than conductors, and when reference is made to two elements coupled together, this means that the two elements may be directly coupled (connected) or coupled via one or a plurality of other elements.

In the following description, expressions "approximately", "substantially", and "in the order of" mean to within 10%, preferably to within 5%.

FIG. 1 very schematically shows an electronic circuit 1 of the type to which the embodiments which will be described may apply.

Circuit 1 comprises:
a calculation entity 11 (UC), for example, a state machine, a microprocessor, a programmable logic circuit, etc.;
one or a plurality of volatile and/or non-volatile storage areas or memories 13 (MEM) for storing all or part of the data and keys;
one or a plurality of data, address, and/or control buses 15 between the different elements internal to circuit 1 and an input-output interface or circuit 17 (I/O) for communicating with the outside of circuit 1.

Circuit 1 may include various other circuits according to the application, symbolized in FIG. 1 by a functional block or circuit 19 (FCT).

Iterative calculation operations, for example, modular exponentiation, can be found in many encryption algorithms, among which, for example, the algorithm known as RSA.

A modular exponentiation comprises calculating result C of the exponentiation of a number or message M by an exponent d (integer) modulo N, that is, applying formula:

$$C=M^d(\mod N).$$

Most often:
number M represents the number (or information representative of the number) which is desired to be encrypted, authenticated, signed, etc.; and
exponent d and modulo N (pair (d, N)) represent the encryption key, the authentication key, the signature key, etc. (or information representative of the key).

Iterative calculation operations can also be found in operations such as scalar multiplications on elliptic curves, which form another category of ciphering algorithms. A scalar multiplication comprises calculating result C of the multiplication of a point P of an elliptic curve by an integer d (scalar) modulo N, that is, applying formula:

$$C=d \cdot P(\mod N).$$

Most often:
point P represents the number (or information representative of the number) which is desired to be encrypted, authenticated, signed, etc.; and
scalar d and modulo N (pair (d, N)) represent the encryption key, the authentication key, the signature key, etc. (or information representative of the key).

As for a modular exponentiation, scalar multiplication on an elliptic curve by an electronic circuit (a state machine, a processor executing the method in the form of a program, a programmable logic circuit, etc.), for example, circuit 1, is most often performed in iterations, for example, on the bits of the scalar.

For simplification, various embodiments are described, by taking as an example an application to a modular exponentiation. The way to transpose these embodiments to a calculation on an elliptic curve is explained hereafter.

Reference is made to a modular exponentiation arbitrarily noted $C=M^d$ (mod N), it being within the abilities of those skilled in the art to perform a transposition to the variables used according to the operation implanted in practice.

The calculation of the modular exponentiation by an electronic circuit (a state machine, a processor executing the method in the form of a program, a programmable logic circuit, etc.), for example, circuit 1, is generally performed by applying methods based on the use of a plurality of variables or registers and by performing iterative calculations on the bits of the exponent.

In the examples described hereafter, the calculation uses at least two registers of circuit 1, or two memory locations, arbitrarily noted R0 and R1, on which the operations will be performed.

For simplification, the registers and their contents will be confounded, that is, when reference is made to operations on the registers, this means on the contents thereof.

Figure 2:
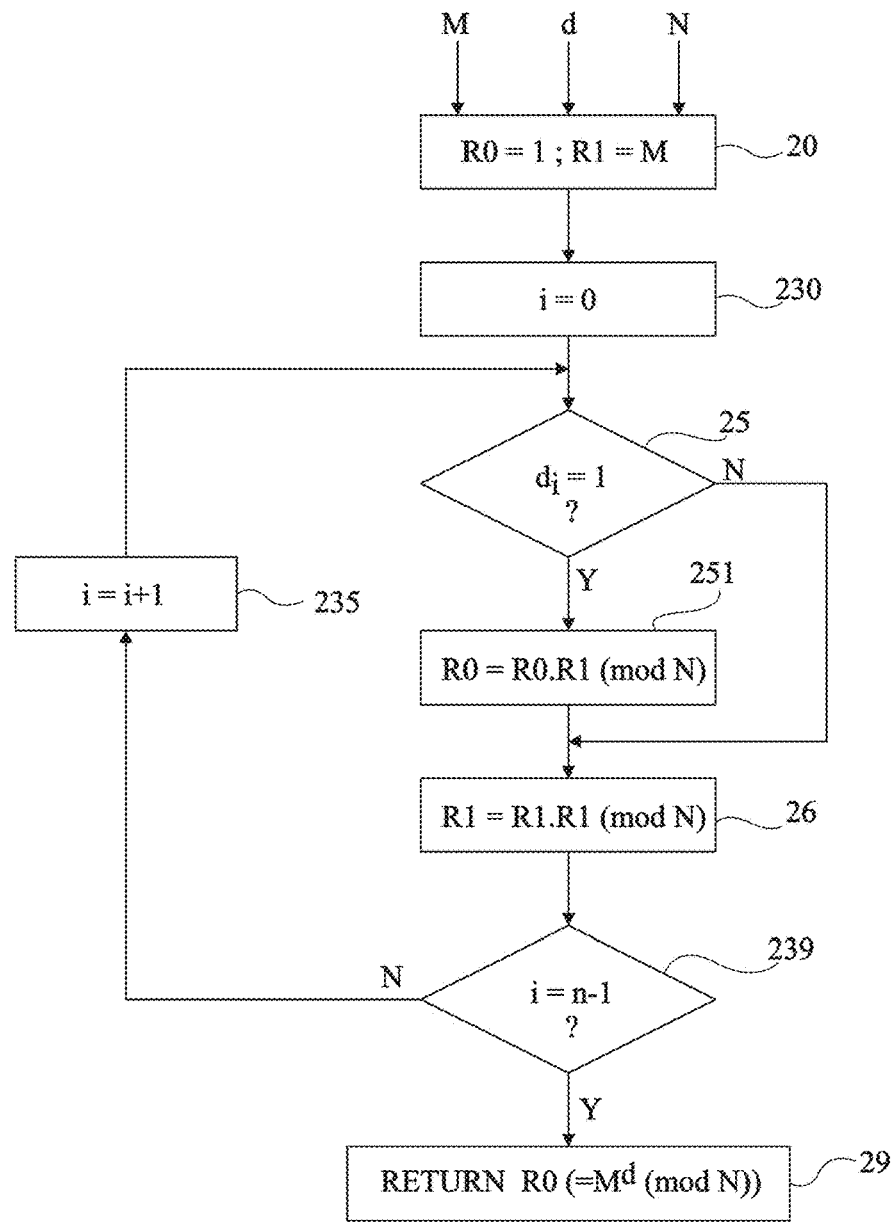
FIG. 2 schematically shows an example of a modular exponentiation calculation.

FIG. 2 shows, in the form of blocks, the steps of an example modular exponentiation calculation.

In a first step (block 20, R0=1; R1=M), register R0 is initialized to 1 and register R1 is loaded with number M. Exponent d is loaded into another register (not shown) or is located in the memory ($d_i$ representing each bit of exponent d, where i designates the rank from 0 to n−1, n representing the exponent size).

A loop calculation on the bits of exponent d is then started. For example, a counter i is initialized to 0, representing the least significant bit (block 230, i=0) and is incremented by 1 (block 235, i=i+1) each time a bit $d_i$ of the exponent is processed, as long as not all the bits have been processed (block 239, i=n−1?).

At each iteration, that is, for each bit $d_i$ (successively from the least significant bit to the most significant bit), it is started by testing the value of the exponent bit (block 25, $d_i$=1?).

If current bit $d_i$ is at 1 (output Y of block 25), the content of register R0 is multiplied, modulo N, by the content of register R1 and the result is placed in register R0 (block 251, R0=R0·R1 (mod N)).

Then, or if current bit $d_i$ is equal to 0 (output N of block 25), the content of register R1 is squared, modulo N, and the result is placed in register R1 (block 26, R1=R1·R1 (mod N)).

As long as not all the bits of exponent d have been processed (output N of block 239), counter i is incremented (block 235, i=i+1) and it is returned to step 25 ($d_i$=1?). Once all the bits of exponent d have been processed (output Y of block 239), register R0 contains the result of the modular exponentiation (block 29, RETURN R0 (=$M^d$ (mod N)), that is, value C=$M^d$ (mod N).

The calculation illustrated in FIG. 2 may also be written as follows:

```
R0 = 1         (step 20)
R1 = M         (step 20)
For i = 0 to n-1   (steps 230, 235, 239):
    If d_i = 1          (step 25)
        R0 = R0.R1 (mod N) (step 251)
    R1 = R1.R1 (mod N)  (step 26)
End of loop    (output Y of block 239)
Return R0      (step 29).
```

The calculation times can be balanced by performing the same number of operations whatever the state of the exponent bit. Thus, the duration of the calculation is independent from the state of the exponent bit.

According to the embodiments described hereafter, it is provided to systematically involve, for each exponent bit, a product of the content of the two registers R0 and R1, multiplied by message M. Then, this intermediate result (stored in a third register R) or a power of this intermediate result is multiplied by the content of one of registers R0 or R1 according to the state of the exponent bit.

Figure 3:
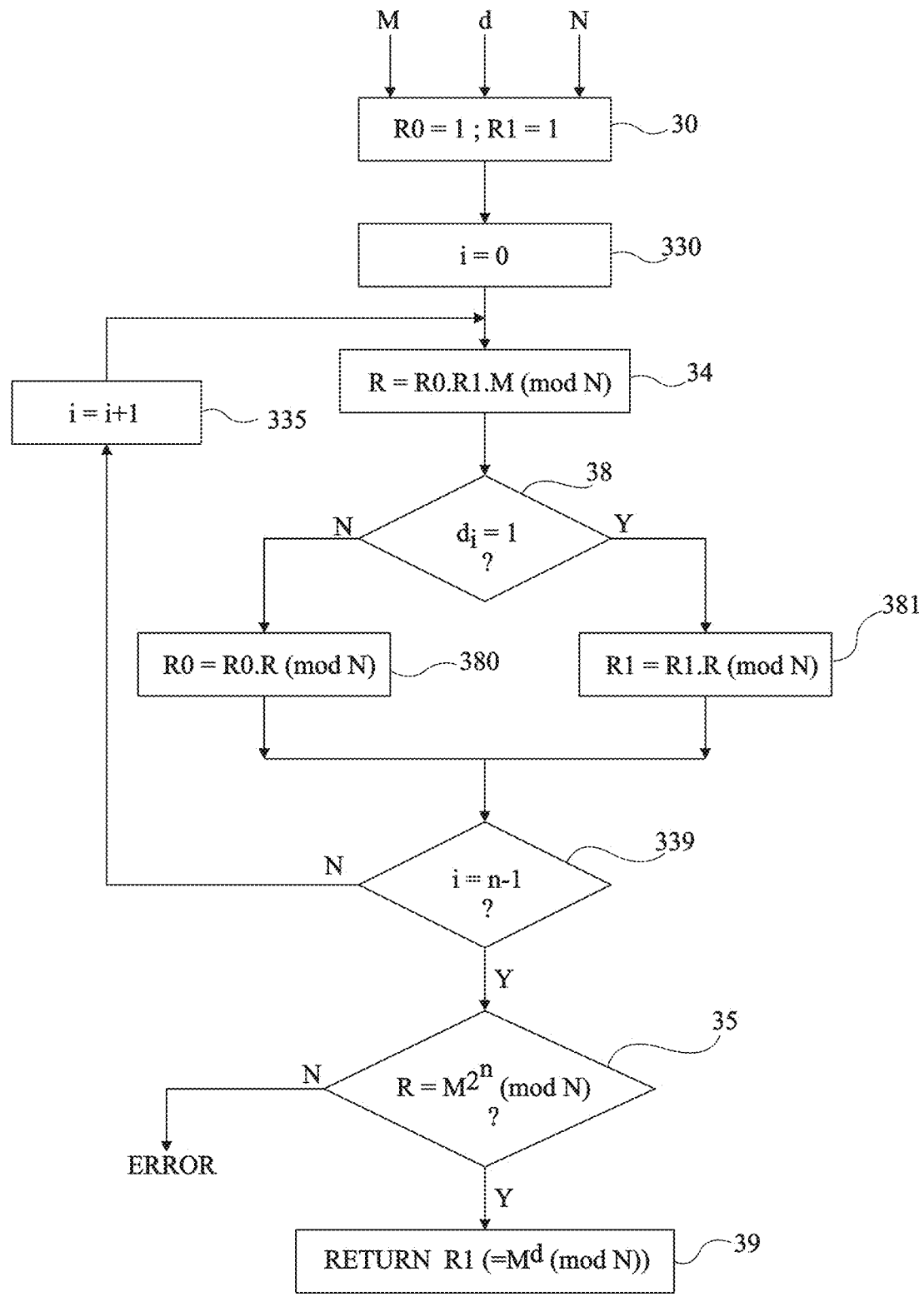
FIG. 3 shows in the form of blocks an embodiment of a method of protecting a modular exponentiation calculation.

FIG. 3 shows, in the form of blocks, the steps of an embodiment of a modular exponentiation calculation according to a first aspect. In a first step (block 30, R0=1; R1=1), the two registers R0 and R1 are initialized to 1. Message M is loaded into another register (not shown) or is located in the memory. The same applies for modulo N. Exponent d is also loaded into another register (not shown) or is located in the memory ($d_i$ representing each bit of exponent d, where i designates the rank from 0 to n−1, n representing the exponent size).

A loop calculation on the bits of exponent d is started. For example, a counter i is initialized to 0, representing the least significant bit (block 330, i=0) and is incremented by 1 (block 335, i=i+1) each time a bit $d_i$ of the exponent is processed, as long as not all the bits have been processed (block 339, i=n−1?).

At each iteration, that is, for each bit $d_i$ (successively from the least significant bit to the most significant bit), it is started (block 34, R=R0·R1·M (mod N)) by multiplying, modulo N, the content of register R0 by the content of register R1 and by message M, and the result is placed in a register R.

Then, the value of the exponent bit is tested (block 38, $d_i=1$?).

If current bit $d_i$ is at 0 (output N of block 38), the content of register R0 is multiplied, modulo N, by the content of register R and the result is placed in register R0 (block 380, R0=R0·R (mod N)).

If current bit $d_i$ is at 1 (output Y of block 38), the content of register R1 is multiplied, modulo N, by the content of register R and the result is placed in register R1 (block 381, R1=R1·R (mod N)).

As long as not all the bits of exponent d have been processed (output N of block 339), counter i is incremented (block 335, i=i+1) and it is returned to step 34. Once all the bits of exponent d have been processed (output Y of block 339), register R1 contains the result of the modular exponentiation, that is, value C=$M^d$ (mod N).

According to a simplified embodiment, the content of register R1 is then returned to the application as the result (block 39, RETURN R1 (=$M^d$ (mod N)).

According to another embodiment, before providing (block 39) the result, that is, at output "Y" of block 339, a step (block 35, R=$M^{2[<]BEGINITALmn}$ (mod N)) of verification that the content of register R is equal to M raised to power 2^n (to power 2 power n) is added. If the condition is respected (output Y of block 35), the result is returned. Otherwise (output N of block 35), the method generates an error (ERROR).

The calculation illustrated in FIG. 3 may also be written as follows:

```
R0 = 1      (step 30)
R1 = 1      (step 30)
For i = 0 to n-1      (steps 330, 335, 339):
    R = R0.R1.M (mod N)      (step 34)
    If d_i = 1      (output Y of block 38)
        R1 = R1.R (mod N)      (step 381)
    Otherwise                  (output N of block 38)
        R0 = R0.R (mod N)      (step 380)
End of loop    (output Y of block 339)
(Option:
If R <> M^{2^n} (mod N) (output N of block 35)
    Error)
Return R1      (step 39).
```

The method described in relation with FIG. 3 protects the calculation against vertical attacks by balancing the calculation times (the number of operations is independent from the state of the bits).

Further, the fact of using register R in addition to registers R0 and R1 improves the protection by ascertaining that not only the nature of the operation (multiplication) is the same in both cases, but also that one of the operands (the content of register R) intervenes whatever the state of the exponent bit.

Further, step 35 enables to detect a fault injection by bit state inversion during the calculation (safe-error attack). Indeed, if one of the operations has been disturbed by an inversion of the state of at least one bit, test 35 enables to detect it.

The protection can also be improved by introducing random numbers to mask input data M, d, and N at each execution.

The embodiment of FIG. 3 is efficient on vertical attacks, which compare a plurality of traces with the same input data. It however does not protect against horizontal attacks, since horizontal attacks use a single trace, and thus a single execution.

Figure 4:
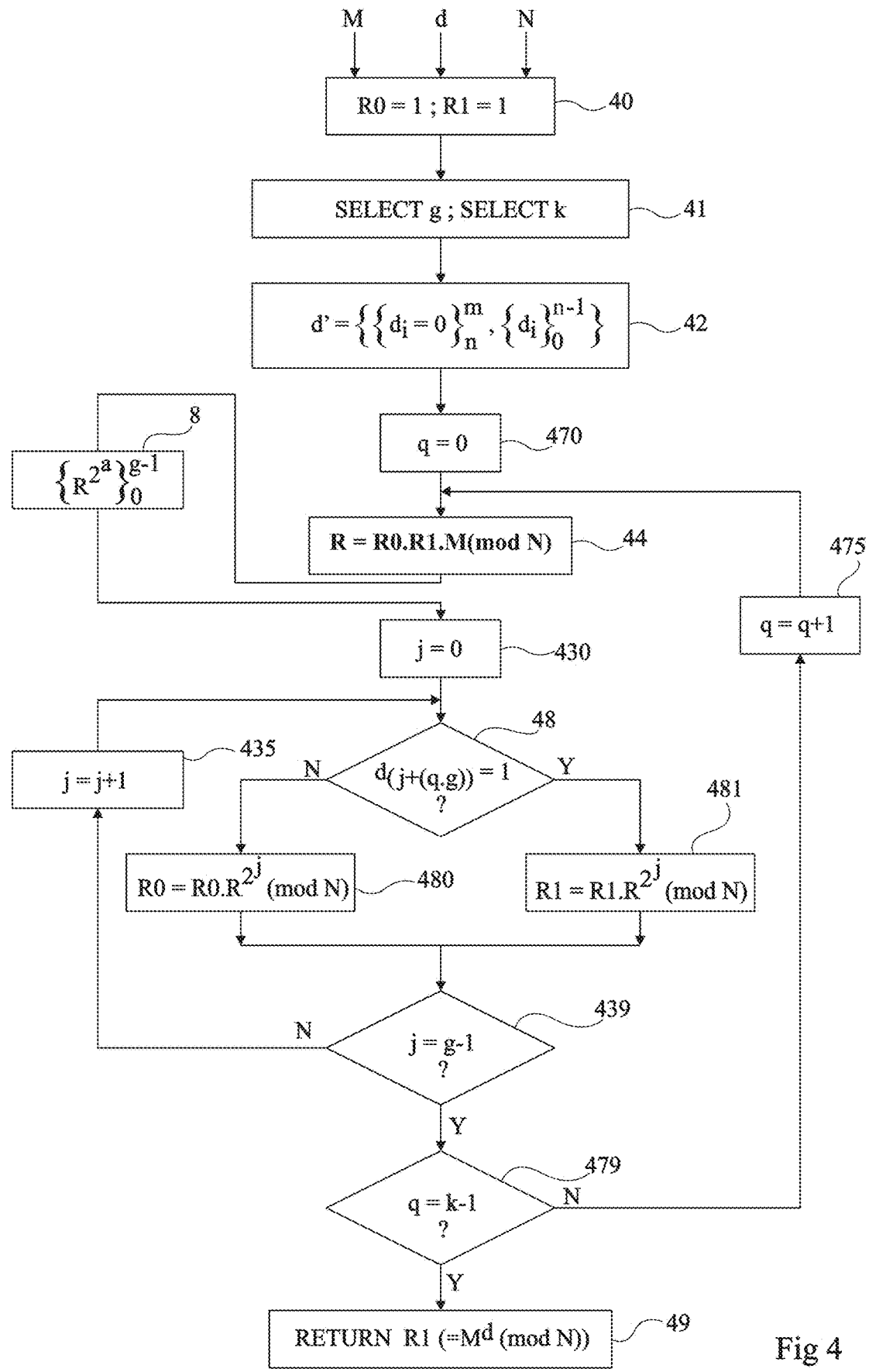
FIG. 4 shows in the form of blocks another embodiment of a method of protection of a modular exponentiation calculation.

FIG. 4 shows, in the form of blocks, another embodiment of a method of protecting a modular exponentiation calculation.

According to this embodiment, the calculations are performed on windows (groups of consecutive bits of the exponent) of identical sizes. In other words, a size g of windows of consecutive bits is set and it is ascertained that the size of exponent d is dividable by g (that n is an integer multiple of g) or exponent d is transformed over n bits into a second larger exponent d' (over m bits). Size m of exponent d' is then selected to be a multiple k of size g of the groups or windows. Second exponent d' is obtained by completing the original exponent d (or first exponent) with "0"s on the most significant bit side (bits from n to m−1, that is, from n to (k·g)−1). This amounts to obtaining second exponent d' by concatenation of first exponent d and of bits at state "0".

The case of an exponent d' over m bits, with m greater than n, is considered hereafter, but all that is described transposes to an exponent d which is not enlarged, but which is dividable into an integer number of g-bit windows.

Thus, in a first step (block 40, R0=1; R1=1), the two registers R0 and R1 are initialized to 1. Message M is loaded into another register (not shown) or is located in the memory. The same applies for modulo N. Exponent d is also loaded into another register (not shown) or is located in the memory ($d_i$ representing each bit of exponent d, where i designates the rank from 0 to n−1, n representing the original exponent size).

One selects (block 41, SELECT g; SELECT k) size g of the windows or bit groups, as well as multiplication coefficient k (integer) so that number m is a multiple of g. In the case where n is a multiple of g, k may be selected such that m=n=k·g.

Exponent d is then modified so that it comprises m bits, without modifying its value. In other words, exponent d is completed, on the most significant bit side from n to m-1, with "0"s (block 42, d'={{$d_i$=0}$_n^{m-1}$, {$d_i$}$_0^{n-1}$}) to obtain the modified exponent d'. Thus, i becomes the rank ranging from 0 to m-1.

A loop calculation over the k windows $W_q$, with q ranging from 0 to k-1, is then started. For example, a counter q is initialized to 0 (block 470, q=0) and is incremented by 1 (block 475, q=q+1) for each processing of a window W as long as not all the windows have been processed (block 479, q=k-1?).

At each iteration, that is, for each window $W_q$, it is started (block 44, R=R0·R1·M (mod N)) by multiplying, modulo N, the content of register R0 by the content of register R1 and by message M, and the result is placed in a register R.

Then a set of powers of the content of register R is precomputed. This corresponds to computing and storing a table of values representing powers $2^a$ of the content of register R (block 8, {$R^{2[<]BEGINITALma}$}) with a ranking from 0 to g-1 (g representing the size of the windows in number of bits). The g resulting values of powers of R are stored, for example, in a set of registers.

A loop calculation is then performed on bits $d_i$ (of exponent d') of the current window $W_q$. For example, a counter j is initialized to 0 (block 430, j=0) and is incremented by 1 (block 435, j=j+1) for each processing of a bit of the exponent as long as not all the bits $d_{j+(q \cdot g)}$ of window $W_q$ have been processed (block 439, j=g-1?).

At each iteration, that is, for each bit $d_i$ (successively from the least significant bit $d_{(q \cdot g)}$ to the most significant bit $d_{(q+1) \cdot g-1}$ or $d_{g-1+(q \cdot g)}$ of the window), it is started by testing the value of bit $d_i$ (with i=j+(q·g)) of the exponent (block 48, $d_{j+(q \cdot g)}$=1?).

If current bit $d_{j+(q \cdot g)}$ is at 0 (output N of block 48), the content of register R0 is multiplied, modulo N, by the content of the register containing R raised to power $2^j$ (or 2^j), and the result is placed in register R0 (block 480, R0=R0·$R^{2[<]BEGINITALmj}$ (mod N)).

If current bit $d_{j+(q \cdot g)}$ is at 1 (output Y of block 48), the content of register R1 is multiplied, modulo N, by the content of the register containing R raised to power $2^j$ (or 2^j), and the result is placed in register R1 (block 481, R1=R1·$R^{2[<]BEGINITALmj}$ (mod N)).

Thus, the calculation takes into account the index of the bit in the window.

It should be noted that, before processing the bits of each window, the set of powers of R of the concerned window are computed and stored, for example, in a set of registers.

As long as not all the bits of window $W_q$ have been processed (output N of block 439), counter j is incremented (block 435, j=j+1) and it is returned to step 48. Once all the bits of window $W_q$ have been processed (output Y of block 439), it is proceeded to the next window.

Thus, as long as not all windows $W_q$ have been processed (output N of block 479), counter q is incremented (block 475, q=q+1) and it is returned to step 44. Once all windows $W_q$, and thus all the bits of exponent d', have been processed (output Y of block 479), register R1 contains the result of the modular exponentiation (block 49, RETURN R1 (=$M^d$ (mod N)), that is, value C=$M^d$ (mod N).

The calculation illustrated in FIG. 4 may also be written as follows:

```
R0 = 1 (step 40)
R1 = 1 (step 40)
Select g, select k    (step 41)
d' = {{d_i = 0}_n^{m-1},{d_i}_0^{n-1}} (step 42)
For q = 0 to k-1   (steps 470, 475, 479):
    R = R0.R1.M (mod N)     (step 44)
    Compute {R^{2^a}}_0^{g-1}    (step 8)
    For j = 0 to g-1         (steps 430, 435, 439):
        If d_{j+(q·g)} = 1 (output Y of step 48)
            R1 = R1.R^{2^j} (mod N)   (step 481)
        Otherwise     (output N of step 48)
            R0 = R0.R^{2^j} (mod N)   (step 480)
    End of loop     (output Y of block 439)
End of loop    (output Y of block 479)
Return R1 (step 39).
```

Another way of writing this calculation is:

```
Select g
Select m such that m/g is an integer (k)
d' = {{d_i = 0}_n^{m-1},{d_i}_0^{n-1}}
R0 = 1
R1 = 1
For q = 0 to k-1:
    W = [d_{q·g}, d_{(q·g)+1}, ..., d_{((q + 1)·g)−1}]
    R = R0.R1.M (mod N)
    Compute {R^{2^a}}_0^{g-1}
    For j = 0 to g-1:
        R_{W[j]} = R_{W[j]}.R^{2^j},
``` where W[j] represents the bit of rank j in window W, and thus bit $d_{j+(q \cdot g)}$ of exponent d'.

This embodiment is resistant against vertical attacks and respects a same number of operations whatever the state of the processed bit, as well as the use of a same register (R) as an operand for each iteration, whatever the state of the exponent bit.

As a variation, the final test (step 35, FIG. 3) may also be introduced to detect a fault injection.

The order of steps 40 and 41, 42, is of no importance (it can be started by defining the windows and generating exponent d', before initializing registers R0 and R1).

Similarly, the order in which the bits are processed within each window is of no importance.

According to the embodiment illustrated in FIG. 4, the bits of the current window are processed sequentially. They may also be processed in the reverse order.

According to another embodiment, the bits of the current window are processed in a random order.

According to another embodiment, a defined permutation (circular or not) of the exponent bits is performed in each window. Such a permutation may be the same for all windows or may be different from one window to another.

This amounts to adding, before step 430, a step performing a permutation s of the positions (or weight) of the g bits of the current window and taking into account, in steps 480 and 481, the rank of the bit resulting from such a permutation.

The embodiment described in relation with FIG. 4 is resistant against horizontal attacks. Indeed, the processing of the exponent in bit windows makes it more difficult to use the single trace in the context of a horizontal attack. In particular, the index of the exponent bit is directly involved in the calculation. The protection is improved by processing the bits within the windows in a different order than their order in the exponent.

Figure 5:
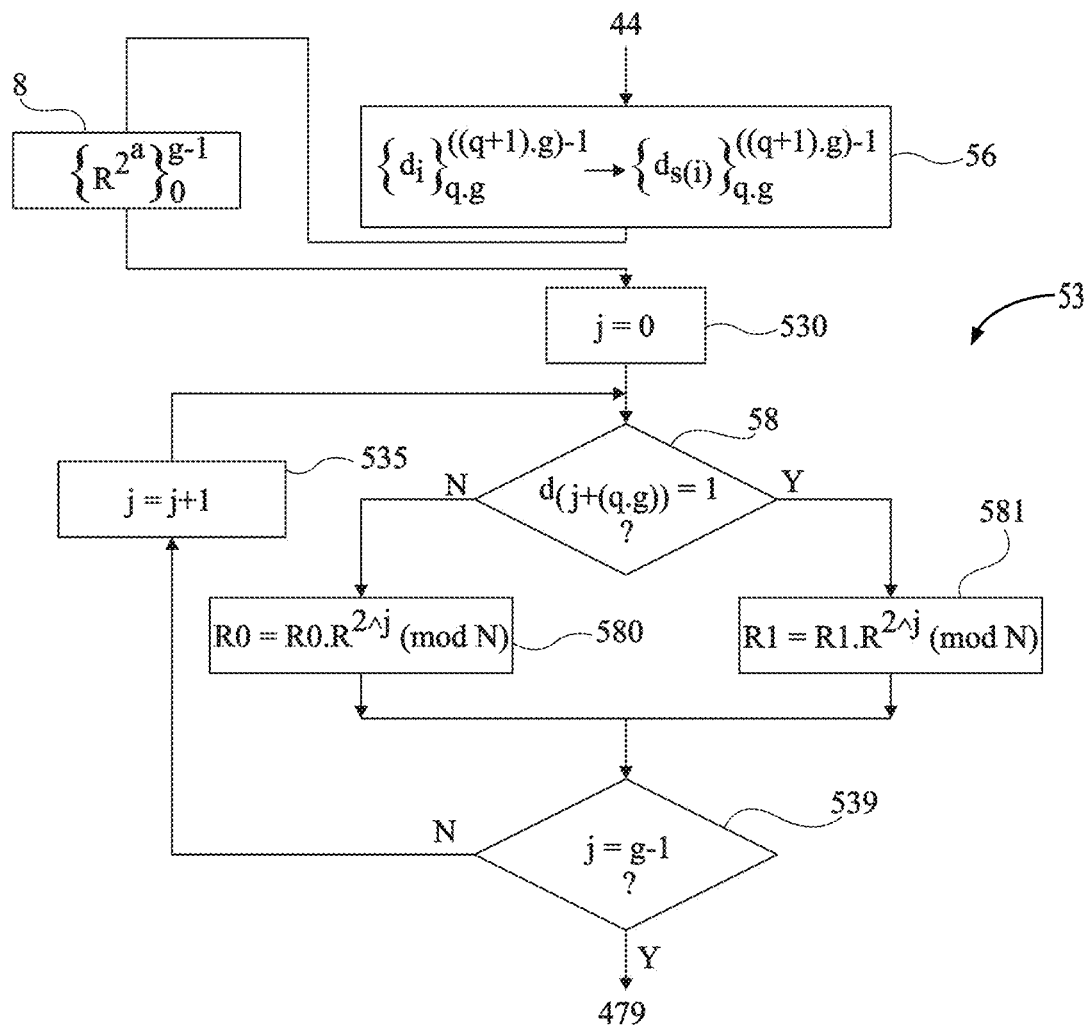
FIG. 5 partially shows in the form of blocks another embodiment of a method of protection of a modular exponentiation calculation.

FIG. 5 shows the steps of the loop on the bits of each window (replacing steps 430, 48, 480, 481, 435, and 439)

according to this embodiment, the other steps being unchanged with respect to the embodiment of FIG. 4.

After step 44 (FIG. 4), a permutation s of the bits $d_i$ of the current window $W_q$ is carried out (block 56, $\{d_i\}_{n \cdot g}^{((q+1) \cdot g)-1} \rightarrow \{d_{z/n}\}^{\{(g+1) \cdot g\}-1\}}$). For example, permutation s is a circular permutation. According to another example, permutation s is a random permutation.

Before processing the bits of each window, the set $\{R^{2^a}\}_0^{g-1}$ of powers of R of the concerned window are computed and stored.

A loop calculation is then performed on bits $d_{s(i)}$ (of exponent d') of the current window $W_q$. Taking the same example as in FIG. 4, a counter j is initialized to 0 (block 530, j=0) and is incremented by 1 (block 535, j=j+1) for each processing of a bit of the exponent, as long as not all the bits $d_{j+(q \cdot g)}$ of window $W_q$ have been processed (block 539, j=g–1?). However, the bits of the window are here processed in the order resulting from permutation s.

At each iteration within the window, that is, for each bit $d_{s(i)}$, with $s(i)=j+(q \cdot g)$, it is started by testing the value of bit $d_{j+(q \cdot g)}$ of the exponent (block 58, $d_{j+(q \cdot g)}=1$?).

If current bit $d_{j+(q \cdot g)}$ is at 0 (output N of block 58), the content of register R0 is multiplied, modulo N, by the content of the register containing R raised to power $2^j$ (or $2^j$), and the result is placed in register R0 (block 580, R0=R0·R$^{2[<]BEGINITALmj}$ (mod N)).

If current bit $d_{j+(q \cdot g)}$ is at 1 (output Y of block 58), the content of register R1 is multiplied, modulo N, by the content of the register containing R raised to power $2^j$ (or $2^j$), and the result is placed in register R1 (block 581, R1=R1·R$^{2[<]BEGINITALmj}$ (mod N)).

As long as not all the bits of window $W_q$ have been processed (output N of block 539), counter j is incremented (block 535, j=j+1) and it is returned to step 58. Once all the bits of window $W_q$ have been processed (output Y of block 539), it is proceeded to the next window (block 479, FIG. 4), as long as the windows have not all been processed.

It should be noted that the calculation of the permutation can be performed on the fly, that is, in loop 53. In this case, step 56 is omitted and index j of loop 53 is replaced with s(j).

The calculation illustrated in FIG. 5 may also be written as follows:

```
R0 = 1 (step 40)
R1 = 1 (step 40)
Select g, select k   (step 41)
d' = {{d_i = 0}_n^{m-1},{d_i}_0^{n-1}}   (step 42)
For q = 0 to k-1    (steps 470, 475, 479):
   R = R0.R1.M (mod N)   (step 44)
   {d_i}_{m,n}^{((q+1)g)-1} → {d_{g(i)}}^{((q+1)g)-1}   (step 56)
   Compute {R^{2^a}}_0^{g-1}   (step 8)
   For j = 0 to g-1   (steps 530, 535, 539):
      If d_{j+(q·g)} = 1 (output Y of step 58)
         R1 = R1.R^{2^j} (mod N)   (step 581)
      Otherwise    (output N of step 58)
         R0 = R0.R^{2^j} (mod N)   (step 580)
   End of loop    (output Y of block 539)
End of loop    (output Y of block 479)
Return R1 (step 49).
```

Another way of writing this calculation is:

```
Select g
Select m such that m/g is an integer (k)
d' = {{d_i = 0}_n^{m-1},{d_i}_0^{n-1}}
R0 = 1
R1 = 1
For q = 0 to k-1:
   W = [d_{q·g}, d_{(q·g)+1}, ..., d_{((q+1)·g)-1}]
   R = R0.R1.M (mod N)
   Compute {R^{2^a}}_0^{g-1}
   s = permutation in W
   For j = 0 to g-1:
      R_{W[s(j)]} = R_{W[s(j)]}.R^{2^{s(j)}},
``` where W[s(j)] represents the bit of rank s(j) of window W.

The embodiments illustrated in relation with FIGS. 3 to 5 can be transposed to another type of iterative calculation used in cryptography, that is, products on elliptic curves.

Figure 6:
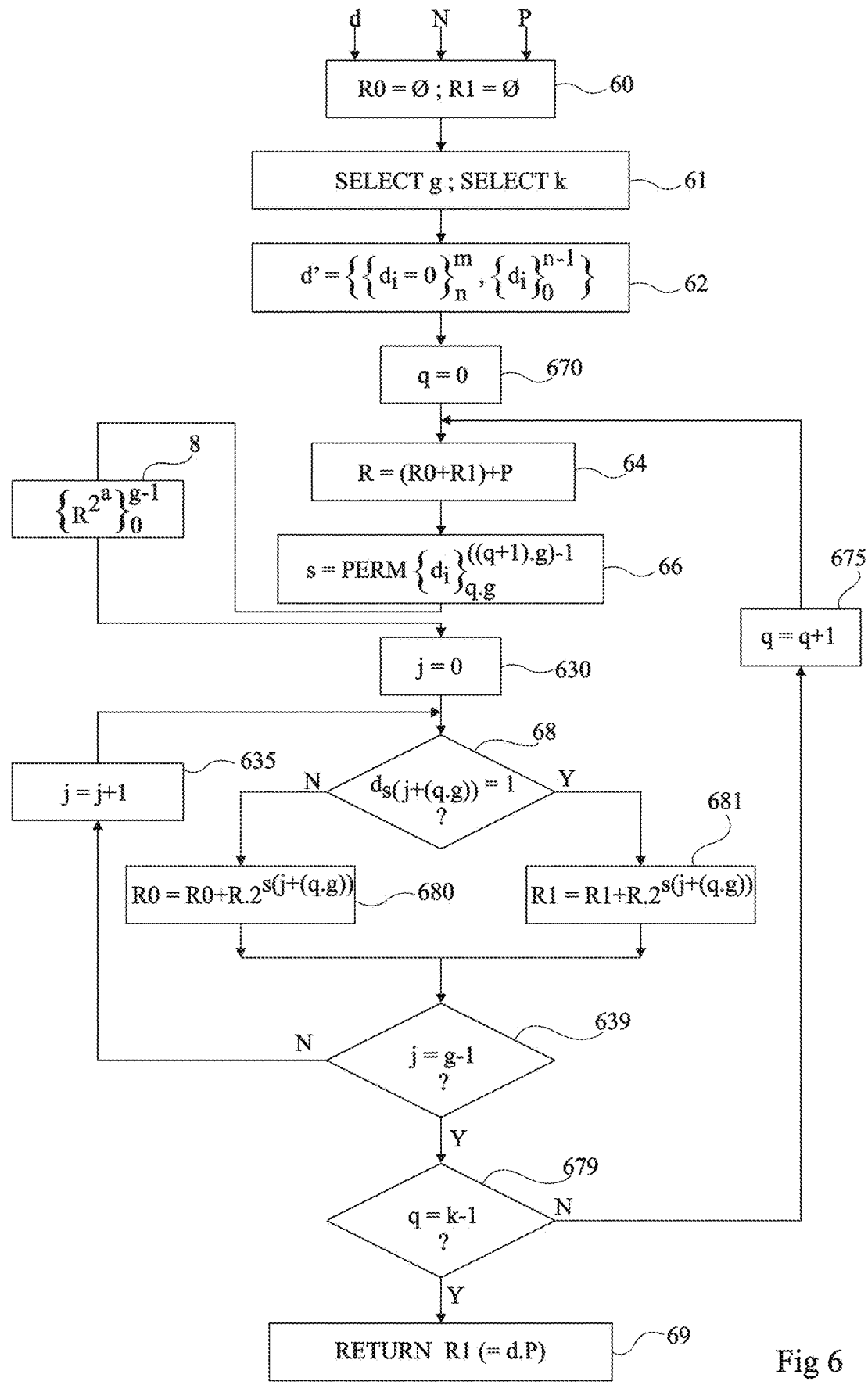
FIG. 6 shows in the form of blocks an embodiment of a method of protection of a calculation on an elliptic curve.

FIG. 6 shows, in the form of blocks, an embodiment of a method of protection of a calculation on an elliptic curve, using the embodiment of FIG. 5.

For simplification, it is not specified for each operation that it is a modular operation, but all the operations of FIG. 6 are also performed modulo N.

In the same way as for a modular exponentiation, the calculations are performed on windows (groups of consecutive bits of the exponent) of identical sizes (g bits) and scalar d is completed, if need be, with 0s on the most significant bit side.

The case of a scalar d' over m bits, with m greater than n, is considered hereafter but all that is described transposes to a scalar d which is not enlarged, but which is dividable into an integer number of g-bit windows.

In a first step (block 60, R0=Ø; R1=Ø), both registers R0 and R1 are initialized to Ø, which represents the neutral element of the elliptic curve. Point P is loaded into another register (not shown) or is located in the memory. The same applies for modulo N. Scalar d is also loaded into another register (not shown) or is located in the memory ($d_i$ representing each bit of scalar d, where i designates the rank from 0 to n–1, n representing the original size of scalar d).

One selects (block 61, SELECT g; SELECT k), size g of the windows or bit groups, as well as multiplication coefficient k (integer) so that number m is a multiple of g. In the case where n is a multiple of g, k may be selected such that m=n=k·g.

Number d is then modified so that it comprises m bits, without modifying its value. In other words, number d is completed on the most significant bit side from n to m–1 with "0"s (block 62, d'={{$d_i$=0}$_n^{m-1}$, {$d_i$}$_0^{n-1}$}) to obtain modified scalar d'. Thus, i becomes the rank ranging from 0 to m.

A loop calculation over the k windows $W_q$, with q ranging from 0 to k–1, is then started. For example, a counter q is initialized to 0 (block 670, q=0) and is incremented by 1 (block 675, q=q+1) for each processing of a window as long as not all the windows have been processed (block 679, q=k–1?).

For each iteration, that is, for each window $W_q$, it is started (block 64, R=(R0+R1)+P) by adding the contents of registers R0 and R1, and point P is added to the obtained result. The result is placed in a register R.

Before processing the bits of each window, the set $\{R^{2^a}\}_0^{g-1}$ of powers of R of the concerned window are computed and stored.

It is assumed that a permutation of the bits of the scalar is applied within each window. FIG. 6 illustrates the variation according to which the permutation is calculated on the fly for each bit, and no longer in advance as was the case for FIG. 5. Thus, a permutation s, for example, circular, random, or other, is defined (block 66, s=PERM{$d_i$}$_{aa}^{\{(q+1) \cdot g\}-1\}}$).

A loop calculation is then performed on bits $d_i$ of the current window $W_q$. For example, a counter j is initialized to 0 (block 630, j=0) and is incremented by 1 (block 635, j=j+1) for each processing of a bit of the window, as long as not all the bits of window $W_q$ have been processed (block 639, j=g−1?).

At each iteration, that is, for each bit $d_{s(j+(q \cdot g))}$, it is started by testing the value of the bit of the scalar (block 68, $d_{s(j+(q \cdot g))}=1$?).

If the current bit is 0 (output N of block 68), the content of the register containing R multiplied by 2 raised to power s(j) ($2^{s(j)}$ or 2^s(j)) is added to the content of register R0 and the result of the addition is placed in register R0 (block 680, R0=R0+R·$2^{s(j)}$).

If the current bit is 1 (output Y of block 68), the content of the register containing R multiplied by 2 raised to power s(j) ($2^{s(j)}$ or 2^s(j)) is added to the content of register R1 and the result of the addition is placed in register R1 (block 681, R1=R1+R·$2^{s(j)}$).

As long as not all the bits of window $W_q$ have been processed (output N of block 639), counter j is incremented (block 635, j=j+1) and it is returned to step 68. Once all the bits of window $W_q$ have been processed (output Y of block 639), it is proceeded to the next window.

Thus, as long as not all windows $W_q$ have been processed (output N of block 679), counter q is incremented (block 675, q=q+1) and it is returned to step 64. Once all windows $W_q$, and thus all the bits of exponent d', have been processed (output Y of block 679), register R1 contains the result of the multiplication on an elliptic curve (block 69, RETURN R1 (=d·P), that is, value C=d·P (mod N).

The calculation illustrated in FIG. 6 may also be written as follows:

```
R0 = Ø        (step 60)
R1 = Ø        (step 60)
Select g, select k   (step 61)
d' = {{d_i = 0}_n^{m-1},{d_i}_0^{n-1}}   (step 62)
For q = 0 to k-1    (steps 670, 675, 679):
    R = (R0+R1)+P      (step 64)
    Compute {R^{2^a}}_0^{g-1}   (step 8)
    S = PERM{d_i}_{n,n}^{((q+1)g)-1}   (step 66)
    For j = 0 to g-1    (steps 630, 635, 639):
        If d_{s(j+(q·g))} = 1 (output Y of step 68)
            R1 = R1+R.2^{s(j+(q·g))}    (step 681)
        Otherwise     (output N of step 68)
            R0 = R0+R.2^{s(j+(q·g))}    (step 680)
    End of loop    (output Y of block 639)
End of loop    (output Y of block 679)
Return R1 (step 69).
```

Another way of writing this calculation is:

```
Select g
Select m such that m/g is an integer (k)
d' = {{d_i = 0}_n^{m-1},{d_i}_0^{n-1}}
R0 = Ø
R1 = Ø
For q = 0 to k-1:
    W = [d_{q·g}, d_{(q·g)+1}, ..., d_{((q+1)·g)-1}]
    R = (R0+R1)+P
    Compute {R^{2^a}}_0^{g-1}
    S = PERM {d_i}_{n,n}^{((q+1)·g)-1}
    For j = 0 to g-1:
        R_{W[s(j)]} = R_{W[s(j)]} + R.2^{s(j)},
``` where $W[s(j)]$ represents the bit of rank j of window W, and thus bit $d_{s(j+(p \cdot g))}$ of scalar d'.

Although the example applied to elliptic curves has been described in relation with an embodiment equivalent to that of FIG. 5 of the modular exponentiation, the embodiments of FIGS. 3 and 4 similarly transpose to calculations on elliptic curves.

Further, the protection of the calculation on elliptic curves may also be reinforced by a protection against fault injection by interposing, before supplying the result, a verification step equivalent to step 35 (FIG. 3). In this case, it is verified that the content of register R is equal to $2^n \cdot P$ (mod N).

More generally, according to the described embodiments, to submit a first number (message M for modular exponentiation, the point of an elliptic curve) to an iterative calculation with a second number (the exponent for modular exponentiation, the scalar for elliptic curves), an operation is provided with a first operator (multiplication for modular exponentiation, addition for elliptic curves) on the content of the two registers R0 and R1, and then on the intermediate result and the first number. The result of this operation is placed in register R.

Then, the result of the previous operation (stored in register R) is submitted to a second operator (raising to a power for modular exponentiation, multiplication for elliptic curves) with a function of the rank of the current bit of the second number, and is then submitted to the first operator with the content of one of registers R0 or R1 according to the state of the bit of the second number.

In the embodiment of FIG. 3, the first operation is performed for each bit of the second number.

In the embodiments of FIGS. 4 to 6, the second number is divided into windows or groups of bits and the first operation is performed once per window of bits of the second number.

Specific embodiments have been described. Various alterations, modifications, and improvements will occur to those skilled in the art. In particular, the selection of the size of the windows and of the length of exponent d' depends on the application and on the acceptable calculation time.

Such alterations, modifications, and improvements are intended to be part of this disclosure, and are intended to be within the spirit and the scope of the present disclosure. Accordingly, the foregoing description is by way of example only and is not intended to be limiting. The present disclosure is limited only as defined in the following claims and the equivalents thereto.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
performing, using an electronic circuit, a calculation on a first number and a second number; and
protecting the performing of the calculation, wherein the method includes:
generating a third number comprising at least the bits of the second number, a number of bits of the third number being an integer multiple of a fourth number;
dividing the third number into blocks each having a size in bits of the fourth number; and
successively, for each block of the third number:
performing a first function, the first function using a first operator and having as inputs: contents of a first register, contents of a second register and the first number, and placing a result of the first function in a third register; and
for each bit of a current block,
performing a second function, the second function using a second operator and having as inputs:
contents of the third register;
a rank of a current bit of the third number; and
the contents of a selected one of the first and the second register according to a state of said current bit; and
placing a result of the second function in the selected one of the first and second register.

2. The method of claim 1 wherein said second function includes raising of number 2 to a power of the rank of the current bit of the third number.

3. The method of claim 1, comprising generating the third number by concatenation of the bits of the second number and of states "0".

4. The method of claim 1 wherein the second register contains the result of the calculation.

5. The method of claim 1 wherein the first and second registers are initialized with a neutral element of the first operator of the first function.

6. The method of claim 1 wherein the first and second functions are performed modulo a fifth number.

7. The method of claim 1, comprising comparing a final content of the third register with a result of a third function performed on the first number and number 2 raised to a power of a number of bits of the second number.

8. The method of claim 1 wherein an index of the bits of each block increases from 0 to a value of the fourth number minus 1.

9. The method of claim 1 wherein bits of a same block are processed in a random order.

10. The method of claim 1 wherein bits of a same block are successively processed.

11. The method of claim 1 wherein an order of the processing of bits of a same block results from a permutation.

12. The method of claim 1 wherein the calculation is a modular exponentiation of the first number by the second number.

13. The method of claim 12 wherein the first operator is multiplication and the second operator is raising to a power.

14. The method of claim 1 wherein the calculation is a multiplication of a point of an elliptic curve by a scalar.

15. The method of claim 14 wherein the first operator is addition and the second operator is multiplication.

16. A device, comprising:
a memory including a plurality of registers; and
cryptographic circuitry coupled to the memory, wherein the cryptographic circuitry, in operation, performs a calculation on a first number and a second number, wherein the performing the calculation includes:
generating a third number comprising at least the bits of the second number, a number of bits of the third number being an integer multiple of a fourth number;
dividing the third number into blocks each having a size in bits of the fourth number; and
successively, for each block of the third number:
performing a first function, the first function using a first operator and having as inputs: contents of a first register of the memory, contents of a second register of the memory and the first number, and placing a result of the first function in a third register of the memory; and
for each bit of a current block,
performing a second function, the second function using a second operator and having as inputs:
contents of the third register;
a rank of a current bit of the third number; and
the contents of a selected one of the first and the second register according to a state of said current bit; and
placing a result of the second function in the selected one of the first and second register.

17. The device of claim 16 wherein said second function includes raising of number 2 to a power of the rank of the current bit of the third number.

18. The device of claim 16 wherein the cryptographic circuitry generates the third number by concatenating bits of the second number and states "0".

19. The device of claim 16 wherein the second register contains the result of the calculation.

20. The device of claim 16 wherein the first and second registers are initialized with a neutral element of the first operator of the first function.

21. The device of claim 16 wherein the first and second functions are performed modulo a fifth number.

22. The device of claim 16 wherein the cryptographic circuitry, in operation:
performs a third function on the first number and number 2 raised to a power of a number of bits of the second number; and
compares a result of the third function to contents of the third register.

23. The device of claim 16 wherein an order of processing of bits of a block is based on a permutation.

24. The device of claim 16 wherein the calculation is a modular exponentiation of the first number by the second number.

25. The device of claim 16 wherein the calculation is a multiplication of a point of an elliptic curve by a scalar.

26. A non-transitory computer-readable medium having contents which cause cryptographic circuitry to perform a calculation on a first number and a second number, wherein the performing the calculation includes:
- generating a third number comprising at least the bits of the second number, a number of bits of the third number being an integer multiple of a fourth number;
- dividing the third number into blocks each having a size in bits of the fourth number; and
- successively, for each block of the third number:
  - performing a first function, the first function using a first operator and having as inputs: contents of a first register of the memory, contents of a second register of the memory and the first number, and placing a result of the first function in a third register of the memory; and
  - for each bit of a current block,
    - performing a second function, the second function using a second operator and having as inputs:
      - contents of the third register;
      - a rank of a current bit of the third number; and
      - the contents of a selected one of the first and the second register according to a state of said current bit; and
    - placing a result of the second function in the selected one of the first and second register.

27. The non-transitory computer-readable medium of claim 26 wherein the contents comprise instructions which, when executed, cause the cryptographic circuitry to perform the calculation.

28. The non-transitory computer-readable medium of claim 26 wherein the first and second functions are performed modulo a fifth number.

* * * * *